Feb. 18, 1936.     W. F. MUENCH     2,031,327
OIL FILTER BASE
Filed July 30, 1934     2 Sheets-Sheet 1
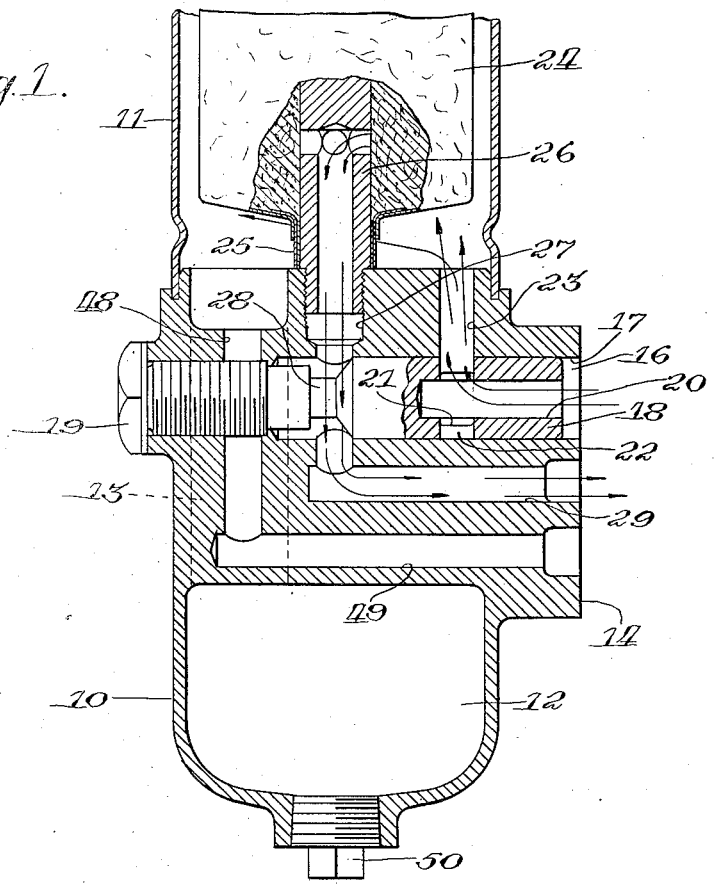
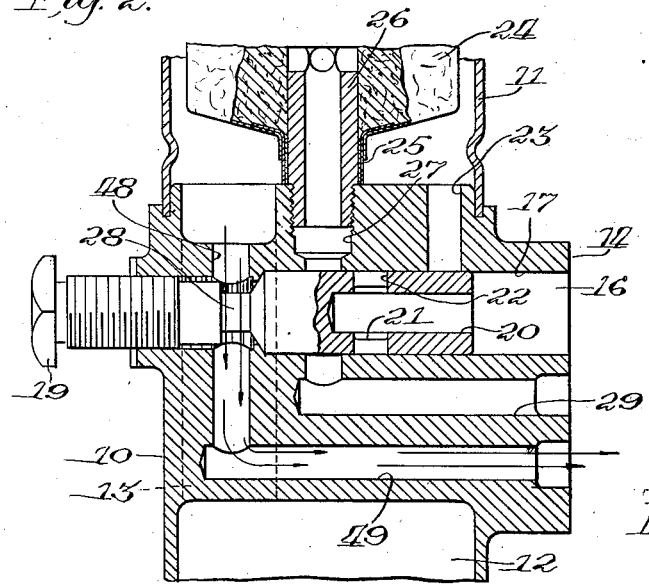
Inventor
W. F. Muench
By
Atty.

Feb. 18, 1936. W. F. MUENCH 2,031,327
OIL FILTER BASE
Filed July 30, 1934 2 Sheets-Sheet 2

Inventor
W. F. Muench
By
Att'y.

Patented Feb. 18, 1936

2,031,327

UNITED STATES PATENT OFFICE 2,031,327

OIL FILTER BASE

William F. Muench, Chicago, Ill., assignor to International Harvester Company, a corporation of New Jersey Application July 30, 1934, Serial No. 737,509

7 Claims. (Cl. 210—165)

This invention relates to a liquid filter. More specifically it relates to an oil filter particularly adapted for filtering lubricating oil of an internal combustion engine.

In the use of oil filters for internal combustion engines, it is necessary to periodically clean the filtering element and remove the sediment and foreign materials from the casing of the filter. This cleaning operation is usually performed when the engine is not in operation. For certain engine uses, where continued operation is necessary and in Diesel engines where starting the engine is such a problem that it is stopped only when necessary, it has been found desirable to clean the oil filter during operation of the engine.

The principal object of the present invention is to devise and construct an oil filter incorporating means for removing and cleaning the filtering element and the compartment in which it is located without interfering with the normal oil circulation to the engine bearings.

Another object is to provide a simplified drain construction in which the by-pass valve arrangement used in the conventional oil filters may be utilized to by-pass the oil flow during the draining and cleaning operation.

These objects and others, which will be apparent from the detail description to follow, are attained by the construction and operation of a device as shown in the attached drawings, in which:

Figure 1 is a vertical cross section through an oil filter incorporating the invention;

Figure 2 shows the same structure as Figure 1 with the draining valve element moved into draining position;

Figure 3:
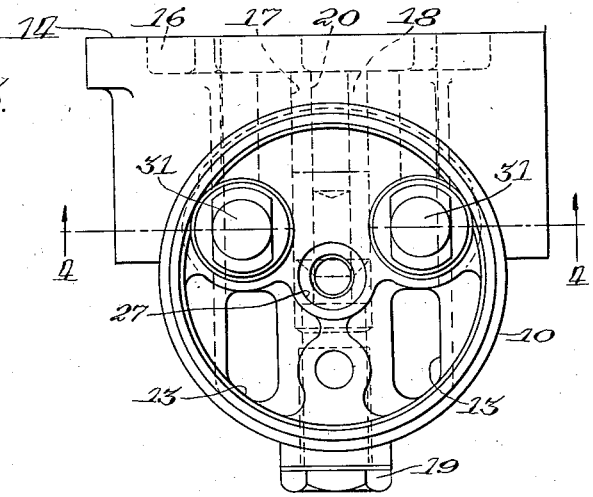
Figure 3 is a top plan view of the filter base with the filtering element and the surrounding container thereof removed.
Figure 5:
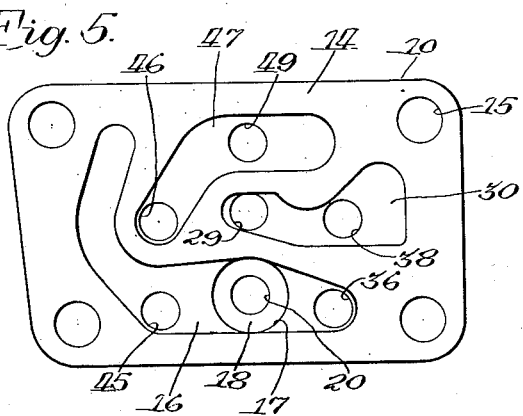
Figure 5 is an elevation of the flat attaching face of the filter base, by means of which it is attached to the crank case of an engine formed to communicate with the various passages provided for the flow of oil.

The oil filter shown in the drawings, taken as a whole, is of a conventional form, as shown in the United States Patent No. 1,901,484, March 14, 1933. The invention resides particularly in the adaption of the novel draining means permitting cleaning during operation, to such a conventional oil filter. The casing of the filter is made up of a base 10 and an upper container 11, which is fitted in an oil tight manner in an annulus formed around the upper end of the base 10. The base 10 is formed as a casting having a lower receptacle 12 communicating by means of cored passages 13 with the upper end, which communicates with the filter compartment formed by the container 11. The base 10 is also formed with a machined face 14, which is adapted to fit against a similar face on the crank case of an engine and to be bolted thereto by a plurality of cap screws fitted through the openings 15. The face portion 14 of the base 10 is formed with a recess 16 shown in plan in Figures 5 and, in section, in Figures 1, 2 and 3. Said recess forms an inlet channel communicating through a portion of its extent with a mating inlet passage, not shown, formed in the crank case of the egine. For the purpose of this description, the recess 16 will be considered as an inlet conduit or passage. A cylindrical bore 17 extends entirely through the base 10 communicating with the inlet passage 16. A cylindrical valve member 18 is slidably and rotatably fitted into the bore 17 in an oil tight manner. At the end opposite the inlet passage 16, the valve member 18 is threaded, corresponding threads being formed in the bore at that end.

A head 19 is formed on the valve member 18 outside the casing to provide means for rotating the valve member and thereby moving it longitudinally of its axis in the bore 17.

At the inlet end of the valve member 18, an axially extending bore 20 is formed to provide an inlet passage which communicates through radial openings 21 with an annular channel 22 formed by a circumferential recess around the valve member. With the valve member in the operating position, as shown in Figure 1, the channel 22 communicates with a conduit 23, which in the particular embodiment shown with the base formed as a casting is a cored passage in the base. The conduit or passage 23 communicates with the filter compartment formed by the container 11. Oil delivered by the oil pump of the engine to the inlet passage 16 passes through the bore 20, the openings 21, the channel 22, and the conduit 23 into the portion of the filtering compartment surrounding a filtering element 24.

The filtering element 24 is generally of a cylindrical construction and may be formed of a porous fabric of any nature having fine enough openings to filter out the injurious foreign material of the oil. The filtering element is connected to a sleeve 25 at its base, which closely fits a stud 26 hollow at its lower end to provide an oil passage therethrough. Said stud holds the container 11 and the filtering element 25 in position, as shown in the United States Patent No. 1,901,484. The stud 26 is threaded into a bore 27 which provides a conduit formed by a cored passage in the base 10. Said bore intersects the bore 17 in which the valve member 18 is located. Intermediate its ends, the valve member 18 is formed with a portion 28 of reduced diameter, thereby forming an annular channel through which oil from the bore 27 may pass through the bore 17 when the valve member is in the filtering position, as shown in Figure 1.

The conduit 27 communicates with a conduit 29, which leads to a second recess 30 formed in the face 14 of the base 10. This recess is adapted to communicate with a passage in the crank case of the engine, not shown, leading to the bearings of the engine and other parts to be lubricated with a source of oil under pressure.

Figure 4:
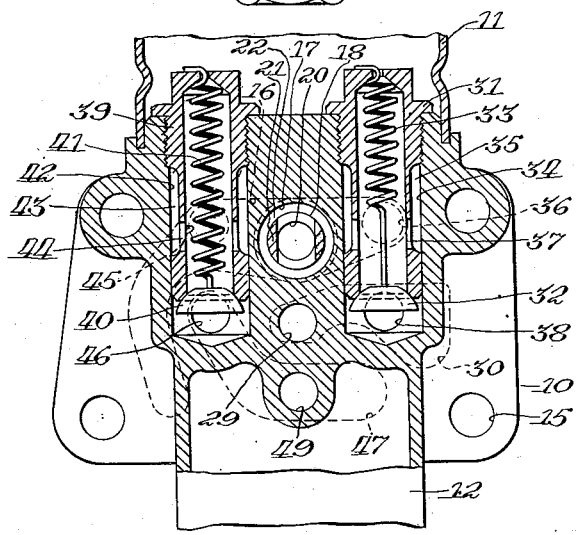
Figure 4 is a section taken on the line 4—4 of Figure 3.

In oil filters of this type, it has been found necessary, to meet conditions, to provide two types of automatic by-pass valves. In the particular embodiment illustrated, these valves have been formed of a similar construction located in relation to the various conduits and passages to provide the desired functions. As shown in Figure 4, a valve cage 31 carrying a valve 32 of the form of a semi-hemisphere and a spring 33, which holds the valve in seated position against the end of the cage, is threaded into a vertical bore 34 formed in the base 10. The cage 31 is provided intermediate its ends with an annular recess 35, which provides a fluid channel communicating through a conduit 36 formed by a cored passage in the base 10 with an inlet passage 16. Openings 37 in the cage provide for the flow of oil from the inlet channel 16 through the conduit 36 into the interior of the cage 31, past the valve 32 when the pressure becomes sufficient to lift said valve, and out through a conduit 38 formed by a cored passage in the base 10 communicating with the recess outlet passage 30 leading to the engine bearings. It will be understood by the provision of this construction that, should the filtering element clog with foreign material until oil will not pass therethrough in any appreciable amount, the increasing oil pressure due to this restriction will lift the valve 32 and deliver oil to the engine bearings, regardless of the condition of the filter. This is the usual safe-guard provided in filters of this type. The construction utilized has a direct bearing on this invention, as a second function is also served, as will be hereinafter described.

There is another condition of engine operation which necessitates the provision of an automatic valve. When the engine is operated at high speed or when the oil is extremely viscous, due to low temperatures, an excessive oil pressure to the bearings may be developed. To prevent this excessive pressure and to provide a substantially uniform oil pressure to the bearings, a pressure release valve is provided. A valve cage 39 carrying a valve 40 formed as a semi-hemisphere and an internal spring 41 holding said valve on its seat in the hollow valve cage is threaded into a vertical bore 42 formed in the base 10. A fluid channel is formed by a recess 43 formed in the valve cage intermediate its ends. Said channel communicates by openings 44 with the interior of the valve cage. A conduit 45 formed by a bore in the base 10 communicates with the inlet channel 16 and with the channel formed by the recess 43, whereby oil may be by-passed from the inlet passage 16 through the conduit 45 into the interior of the valve cage 39 and past the valve 40 when the pressure in the inlet supply passage exceeds a predetermined amount, as determined by the setting of the valve 40. As by-passed by said valve, the oil flows through a conduit 46 formed by a cored passage in the base 10 into a third recessed channel 47 formed in the face portion of the base 10. This passage communicates with the oil supply reservoir of the engine through a passage in the crank case, not illustrated. The passage formed by the recess 47 will be termed hereinafter as an overflow passage.

It will be understood by the construction as described that the maximum pressure to the engine bearings is regulated by the valve 40. This is conventional practice and is not a part of the present invention only in so far as it cooperates with the particular cut-off and draining valve described and claimed. A vertical draining conduit 48 formed by a cored passage in the base 10 extends from the upper portion of the base downwardly and connects with a horizontal passage 49. The conduit 48 extends directly through the bore 17. With the valve member 18 in the closed operating position, as shown in Figure 1, the conduit 48 is completely cut off.

In connection with the description of the parts making up the oil filter disclosed, the operation has been described during which oil is filtered and delivered either to the engine bearings or back to the crank case, depending upon the pressures produced in the oil supply system. When the filter is to be drained and cleaned, it is not necessary to stop operation of the engine. This draining and cleaning is performed by rotating the valve member 18 until it has been moved longitudinally into the position shown in Figure 2. Inspection of this figure will show that with the valve member so positioned, the inlet conduit 23 to the filter compartment is entirely cut off. The outlet conduit 27 from the interior of the filtering element is also completely cut off. It is obvious that pressure is then developed in the inlet passage 16, due to a complete restriction of the normal flow through the filter. The by-pass valve 32 then functions to by-pass oil without being filtered direct to the outlet passage 30, which leads to the bearings. The oil in an engine is maintained in a sufficiently clean state so that the supply of unfiltered oil to the bearings for a short time is not injurious.

The axial movement of the valve member 18 brings the restricted portion 28 of the valve member into alignment with the drain conduit 48, whereby the oil contained in the filtering compartment is drained back to the crank case of the engine through the overflow passage 47. The draining of the oil may be facilitated by releasing the sealing means on the container 11 sufficiently to admit a certain amount of air to break the vacuum. Substantially all of the oil is drained from the filter compartment down to the level of the upper end of the drain conduit 48. The filter element may then be removed and cleaned, and the remainder of sediment in the base 10 may be drained therefrom by removal of a plug 50 at the bottom. During this operation the engine is continued in operation at part or full load without any interference. The filter 24, after cleaning, is replaced in position with its surrounding container 11. The valve member 18 is moved longitudinally into its position for filtering, as shown in Figure 1. The drain conduit 48 is thereby cut off and oil is again circulated through the filtering element.

It is to be understood that applicant has shown and described only a preferred embodiment of his improvement in an oil filter incorporating cleaning means, and that he claims as his invention all modifications falling within the scope of the appended claims.

What is claimed is:

1. An oil filter comprising a casing, a filtering element in said casing, an inlet conduit leading to the casing outside said element, an outlet conduit leading from the interior of the element, a by-pass conduit between the inlet conduit and the outlet conduit containing a pressure controlled valve, a drain conduit leading from the casing, a valve element extending through the inlet conduit, the outlet conduit and the drain conduit, said element being formed with channels to provide for liquid flow through the inlet and outlet conduits when the valve element is in one position, and means for moving the valve element axially into another position in which the outlet and inlet conduits are closed and the drain conduit is open.

2. An oil filter comprising a casing, a filtering element in the upper end of said casing, an inlet conduit leading to the casing outside said element, an outlet conduit leading from the interior of the element, a by-pass conduit between the inlet conduit and the outlet conduit containing a pressure controlled valve, a drain conduit leading from the casing below the filtering element and above the bottom of the casing, a valve element extending through the inlet conduit, the outlet conduit and the drain conduit, said element being formed with channels to provide for liquid flow through the inlet and outlet conduits when the valve element is in one position, and means for moving the valve element axially into another position in which the outlet and inlet conduits are closed and the drain conduit is open.

3. An oil filter comprising a casing, a filtering element in said casing, an inlet conduit leading to the casing outside said element, an outlet conduit leading from the interior of the element, a by-pass conduit between the inlet conduit and the outlet conduit containing a pressure controlled valve, a drain conduit leading from the casing, and a valve element threaded through the casing and extending through the inlet conduit, the outlet conduit and the drain conduit, said element being formed with channels to provide for liquid flow through the inlet and outlet conduits when the valve element is in one position, said valve element being movable by rotation into another position in which the outlet and inlet conduits are closed and the drain conduit is open.

4. An oil filter comprising a casing, a filtering element in said casing, an inlet conduit leading to the casing outside said element, an outlet conduit leading from the interior of the element, a by-pass conduit between the inlet conduit and the outlet conduit containing a pressure controlled valve, a drain conduit leading from the casing, a valve element extending through the inlet conduit, the outlet conduit and the drain conduit, said element being formed with channels to provide for liquid flow through the inlet and outlet conduits when the valve element is in one position, and means for moving the valve element axially into another position in which the outlet and inlet conduits are closed and the drain conduit is open, one of the channels providing flow through the outlet and inlet channels forming in this position a drain channel.

5. An oil filter comprising a base portion, a container mounted above said base portion, a filtering element mounted in said container, a supply conduit leading from a source of oil under pressure to one side of the filtering element, a discharge conduit for filtered oil leading from the other side of the filtering element, a by-pass conduit between the supply and discharge conduit adapted to by-pass oil upon a predetermined pressure in the supply conduit, a valve member intercepting the supply and discharge conduits between the filtering element and the by-pass conduit, said valve member being movable longitudinally of its length and being formed to permit free passage of oil through said conduits in one position and being formed to stop the flow of oil through both conduits in another position, and a drain conduit communicating with the container, said valve member being positioned to intercept said conduit when oil is being delivered to the container and being formed with a passage to provide free communication between the container and the drain passage when the valve member is in a position to cut off flow through the supply and discharge conduits.

6. An oil filter comprising a base, a hollow filtering element fitted to said base, a container surrounding the filtering element and secured to the base, a bore formed in the base extending therethrough, a valve element fitted in said bore and slidable therein, a bore formed in one end of the valve element, an annular channel formed around said element spaced from the end of said bore and being in communication therewith, an inlet conduit formed in the base communicating with said channel and with the filter element compartment outside the element, a second annular channel formed around the valve element by a restricted portion thereof, an outlet conduit formed in the base communicating with the inside of the filtering element with said channel and with an outlet formed in the base, a drain conduit formed in the base and communicating with the filter compartment, with the cylindrical bore formed in the base and with a drain passage, said conduits and said channels being located relative to each other so that by axial movement of the valve element by rotation thereof the inlet and outlet conduits are cut off and the drain passage is put into communication through one of the channels whereby oil is drained from the filter compartment.

7. An oil filter comprising a base, a filtering element fitted to said base, a container surrounding the filtering element and secured to the base, a cylindrical bore formed in the base extending therethrough, one end of the bore being threaded, a valve element fitted in said bore and threaded therein whereby it may be moved axially by rotation, a bore formed in one end of the valve element, an annular channel formed around said element spaced from the end of said bore and being in communication therewith, an inlet conduit formed in the base communicating with said channel and with the filter element compartment outside the element, a second annular channel formed around the valve element by a restricted portion thereof, an outlet conduit formed in the base communicating with the inside of the filtering element of said channel and with an outlet formed in the base, a drain conduit formed in the base and communicating with the filter compartment, with the cylindrical bore in the base and with a drain passage, said conduits and said channels being located relative to each other so that by axial movement of the valve element by rotation thereof the inlet and outlet conduits are cut off and the drain passage is put into communication through one of the channels whereby oil is drained from the filter compartment.

WILLIAM F. MUENCH.